United States Patent [19]
Goodnow et al.

[11] Patent Number: 6,026,471
[45] Date of Patent: Feb. 15, 2000

[54] ANTICIPATING CACHE MEMORY LOADER AND METHOD

[75] Inventors: Kenneth Joseph Goodnow, Essex Junction; Clarence Rosser Ogilvie, Huntington; Wilbur David Pricer, Charlotte; Sebastian Theodore Ventrone, South Burlington, all of Vt.

[73] Assignee: International Business Machines Corporation, Armonk, N.Y.

[21] Appl. No.: 08/751,468

[22] Filed: Nov. 19, 1996

[51] Int. Cl.⁷ .............................. G06F 12/10; G06F 17/12
[52] U.S. Cl. ................. 711/137; 711/6; 711/118; 711/137; 711/160
[58] Field of Search ...................................... 711/118, 137, 711/160, 213, 200, 6, 141, 19, 152, 206, 217, 139

[56] References Cited

U.S. PATENT DOCUMENTS

| | | | |
|---|---|---|---|
| 4,635,186 | 1/1987 | Oman et al. | 364/200 |
| 4,701,844 | 10/1987 | Thompson et al. | 364/200 |
| 5,168,560 | 12/1992 | Robinson et al. | 395/425 |
| 5,289,581 | 2/1994 | Berenguel et al. | 395/275 |
| 5,371,872 | 12/1994 | Larsen et al. | 395/425 |
| 5,574,878 | 11/1996 | Onodera et al. | 395/417 |
| 5,615,362 | 3/1997 | Jenson et al. | 395/614 |
| 5,642,494 | 6/1997 | Wang et al. | 395/467 |
| 5,692,193 | 11/1997 | Jagannathan et al. | 395/676 |
| 5,784,548 | 7/1998 | Liong et al. | 395/184.02 |
| 5,802,575 | 9/1998 | Greenley et al. | 711/144 |

*Primary Examiner*—John W. Cabeca
*Assistant Examiner*—David Ransom
*Attorney, Agent, or Firm*—Schmeiser, Olsen & Watts; Eugene I. Shkurko

[57] ABSTRACT

According to the present invention, an anticipating cache memory loader is provided to "pre-load" the cache with the data and instructions most likely to be needed by the CPU once the currently executing task is completed or interrupted. The data and instructions most likely to be needed after the currently executing task is completed or executed is the same data and instructions that were loaded into the cache at the time the next scheduled task was last preempted or interrupted. By creating and storing an index to the contents of the cache for various tasks at the point in time the tasks are interrupted, the data and instructions previously swapped out of the cache can be retrieved from main memory and restored to the cache when needed. By using available bandwidth to pre-load the cache for the next scheduled task, the CPU can begin processing the next scheduled task more quickly and efficiently than if the present invention were not utilized. Using the present invention, CPU stalls will be reduced because the CPU will operate more efficiently without waiting for excessive periods of time for the cache to be loaded with relevant data and instructions.

10 Claims, 2 Drawing Sheets

ANTICIPATING CACHE MEMORY LOADER AND METHOD

BACKGROUND OF THE INVENTION

1. Technical Field

This invention generally relates to computer system memory and more specifically relates to cache memory management.

2. Background Art

Today, our society is heavily dependent upon computers for everyday activity. Computers are found in homes, in business offices, and in most production and manufacturing environments. Most computer systems are controlled by a central processing unit (CPU) and have various levels of memory which can be used by the CPU to perform the various functions for which it has been programmed. Typically, computer programs are loaded into the computer system's memory storage areas and executed by the CPU. The programs and data are stored in different areas of the computer system's memory depending on what type of function the CPU is performing. Traditionally, the computer system's memory has been classified as either main memory (primary or main storage) or secondary memory (secondary storage).

Programs and data need to be in main memory in order to be executed or referenced by a running program. Programs or data not needed immediately may be kept in secondary memory until needed and then brought into main storage for execution or reference. The internal storage locations of a given memory location are often referred to as "lines of memory." Secondary memory media such as tape or disk are generally less costly than the main memory and have much greater capacity. Main memory may generally be accessed much faster than secondary memory.

In the 1960s it became clear that the traditional memory storage hierarchy could be extended by one more level with dramatic improvements in performance and utilization. This additional level, the "cache," is a high-speed memory that is much faster than the main memory. Cache storage is relatively expensive when compared with main memory and therefore, in a typical computer system, only relatively small amounts cache memory are used. In addition, limiting the size of cache storage enhances the speed of the cache.

Cache memory imposes one more level of memory management overhead on the computer system. Programs or data in the main memory are shuttled or "swapped" into the high-speed cache before being executed or referenced. The programs or data that were previously residing in the cache must be "swapped" out, usually on a "least-recently-used" basis. This means that if there is no room in the cache and room is needed for additional instructions, then the information that has not been accessed for the longest period of time will be swapped out of the cache and replaced with the new information. In this manner, the most recently used information has the greatest likelihood of being available in the cache at any given time.

Cache memory generally operates faster than main memory, typically by a factor of five to ten times and may, under certain circumstances, approach the operational speed of the CPU itself. By keeping the most frequently accessed instructions and/or data in high speed cache memory, average overall memory access time for the system will approach the access time of the cache. There is a certain amount of overhead involved in shuttling information between various memory locations. This overhead is kept as small as possible so that it does not cancel out the performance increase achieved by utilizing cache storage. In addition, if the specific program instruction to be executed has been pre-loaded into the cache, the CPU may execute the program instruction without returning to either main memory or secondary memory, thereby significantly increasing the operational speed of the system. Whenever the CPU requests a specific instruction or item of data, the CPU generates a request which includes a tag as part of the address or location in memory where the instruction or data may be found. If the tag for the information requested by the CPU matches a tag for a line of memory currently residing in the cache, then the CPU can access the data or instruction from the cache. If the tag doesn't match any of the tags for the lines of memory in the cache, then the information must be fetched and loaded into the cache.

Cache memory may be subdivided into different categories based on what part of the computer system it is located on or associated with. "On-chip" cache memory is co-located on the microprocessor chip with the CPU and is usually referred to as Level 1 cache memory. Additional cache memory that is not located on the same chip with the microprocessor is usually referred to as Level 2 or Level 3 cache memory.

Even with a cache memory management scheme, there are additional, related problems that can cause system performance to suffer. For example, in data processing systems with several levels of memory storage, a great deal of shuttling goes on in which programs and data are moved back and forth between the various memory levels. This shuttling consumes system resources such as CPU time and bus bandwidth that could otherwise be put to more productive processing use. This problem has been exacerbated in recent years by the growing disparity between the processing speed of the CPU and the operational speeds of the different computer system components used to transfer information and instructions to the CPU. In the past few years, the processing speed of CPUs in general has increased tremendously while the operational speeds of related system components have not progressed as quickly.

For example, a few short years ago, CPU processing speeds in the range of 16 MHz–33 MHz were fairly common. Presently, however, CPUs operate at processing speeds in excess of 180 MHz with some CPUs exceeding even 200 MHz. In contrast, the processing speed of other data processing system components, particularly those components used to deliver data to the CPU for processing, have not kept pace. This has resulted in a well-known performance problem for computer systems. Specifically, even with a cache memory management system in place, it can take so long to deliver information to the cache that the CPU may spend a relatively long period of time waiting for required information to be loaded into the cache. Whenever the CPU needs to process data or instructions that are unavailable in the cache, the CPU "stalls" until the necessary information is loaded from the external memory bus into the cache. The CPU, in effect, is "starved" for data and wastes valuable processing time waiting for the necessary data or instructions to become available.

Cache memory is often used in high speed data processing system architectures which also often include multiple interrupt levels. An interrupt is a signal sent to the CPU which alerts the CPU that another task needs to be serviced. As is well known to those skilled in the art, an interrupt may be an "external" interrupt, for example from a keyboard, disk drive, or other peripheral unit, or may be an "internal" interrupt from an internally generated timer. Upon occurrence of an interrupt, the currently executing task is interrupted and a first (interrupting) task is performed. The interrupted task may be resumed after completion of the interrupting task.

Frequent task interruptions typically degrade the performance of a cache memory. When the currently executing task is interrupted, the cache has been loaded with the data and instructions necessary to process the specific task that is executing at the time the interrupt occurs. The interrupting task is typically unrelated to the previously executing task and therefore, the data and instructions in the cache are not the data and instructions required to perform the interrupting task. This means that the cache must be emptied out and loaded with the new data and instructions necessary to process the interrupting task. Once again, frequent trips to main memory may be required before the cache will be loaded with the data and instructions necessary to process the interrupting task. Accordingly, the performance of the CPU decreases dramatically and, correspondingly, overall system performance will be degraded.

Similarly, once the interrupting task has run to completion and the interrupted task resumes processing or some other scheduled task begins processing, the data and instructions loaded in the cache for the interrupting task are typically unrelated to the data and instructions necessary for processing the next task and the cache will have to be loaded with a different set of data and instructions once again. Obviously, the more frequently these interrupts occur, the more frequently the cache must be reloaded with data and instructions from main memory and, once again, overall system performance will suffer. Therefore, in order to improve system performance, the cache must ideally contain the data and instructions necessary for the CPU to complete any task that is currently being processed as quickly as possible.

As explained above, the loading of data and instructions from main memory into a cache over the external memory bus can become a significant bottleneck, especially if the CPU frequently switches tasks and needs additional information loaded into the cache. Significant performance problems can occur because of this bottleneck. Once the cache is loaded with the necessary data, overall system operation can approach the maximum operational speed of the CPU and the cache. With the recent increase in data processing system using multi-tasking operating systems, frequent interrupts are becoming even more of a problem for system performance. However, without a way to efficiently load and optimize the contents of the cache for more effective processing by the CPU, the overall performance of data processing systems will continue to suffer.

Therefore, there exists a need to provide an apparatus and method to more effectively utilize cache memory and thereby improve the performance of a CPU-based data processing system. This apparatus and method should allow the cache to be loaded with the data and instructions most likely to be requested by the CPU at the times the CPU is most likely to request the given data and instructions. This apparatus and system should increase overall system performance by decreasing CPU stalls and by providing data and instructions to the cache in a more efficient manner than existing systems.

DISCLOSURE OF INVENTION

According to the present invention, an anticipating cache memory loader is provided to "pre-load" the cache with the data and instructions most likely to be needed by the CPU once the currently executing task is completed or executed.

In general, the data and instructions most likely to be needed by the CPU after the currently executing task is completed or executed is the data and instructions for the next task scheduled by the operating system task scheduler. The most current data and instructions are the lines of memory that were in the cache when that task was preempted or interrupted. By creating and storing an index to the contents of the cache for various tasks at the point in time these tasks are interrupted, the data and instructions previously swapped out of the cache can be quickly retrieved and restored to the cache when needed. This allows any previously executing task to quickly begin processing more efficiently than if the present invention were not utilized. Using the present invention, the CPU will operate more efficiently without waiting for excessive periods of time for the cache to be loaded with relevant data and instructions. This will have the effect of improving the overall performance of the data processing system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
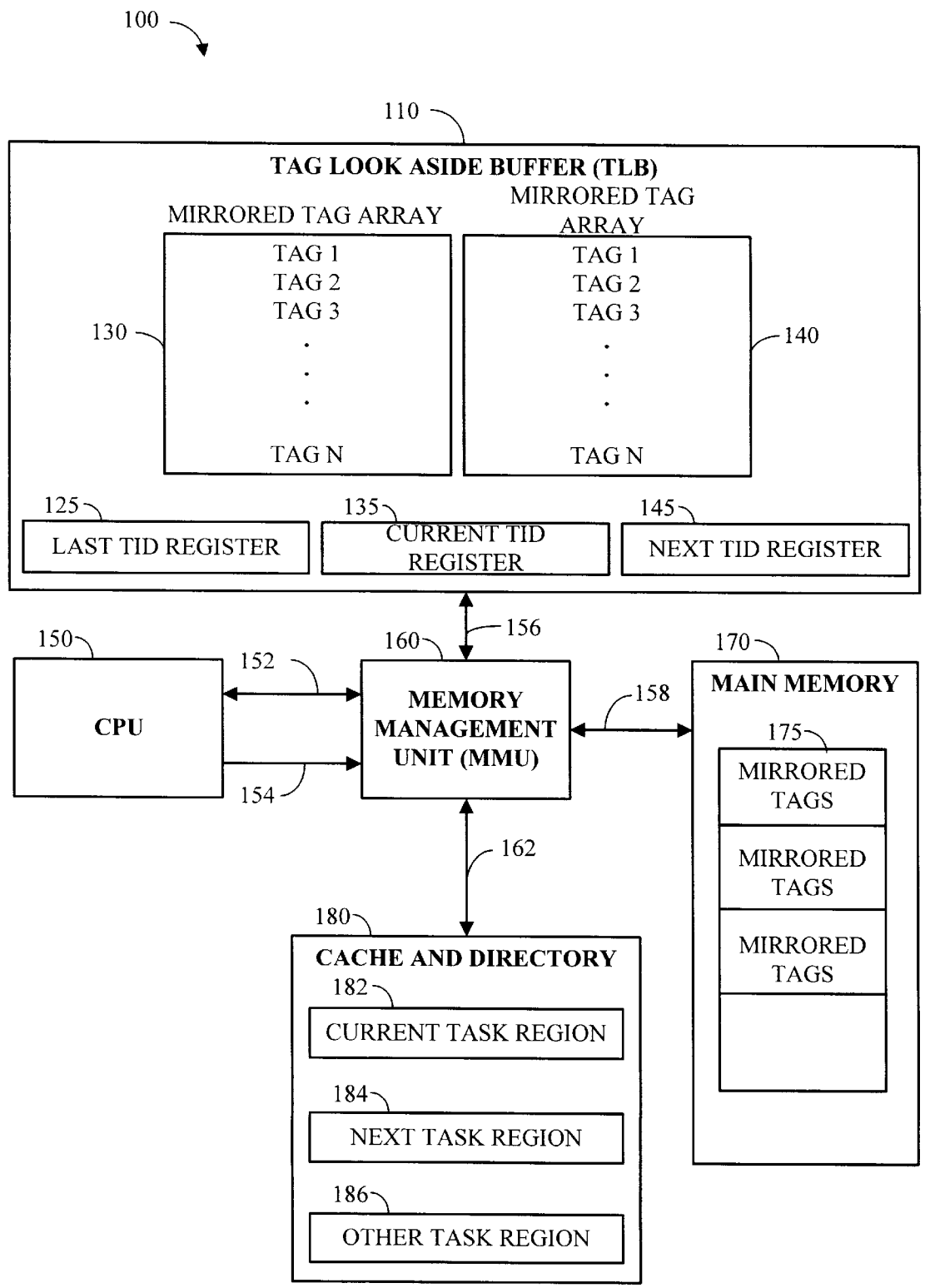
FIG. 1 is a block diagram of an anticipating cache loader according to a preferred embodiment of the present invention.

The Overview Section immediately below is intended to provide an introductory explanation of the basic theory of cache memory operations for individuals who need additional background in this area. Those who are skilled in the art may wish to skip this section and begin with the Detailed Description Section instead.

OVERVIEW

The program instructions and data needed by a CPU are selected and placed into cache memory by utilizing a phenomenon known as "locality of reference." The locality of reference phenomenon recognizes that most computer program instruction processing occurs in a sequential fashion with multiple loops, and with the CPU repeatedly referring to a set of instructions in a particular localized area of memory. Thus, loops and subroutines tend to localize the references to memory for fetching instruction. Similarly, memory references to data also tend to be localized, because table look-up routines or other interactive routines typically refer to a small portion of memory repeatedly.

In view of the phenomenon of locality of reference, a small, high speed cache memory may be provided for storing a block of memory containing data and/or instructions which are presently being processed. Although the cache is only a small fraction of the size of main memory, a large fraction of memory requests over a given period of time will be found in the cache memory because of the locality of reference property of programs and data.

In a CPU with a relatively small, relatively high speed cache memory and a relatively large, relatively low speed main memory, the CPU examines the cache when a memory access instruction is processed. If the desired instruction or word is found in the cache, it is read directly from the cache. If the word is not found in the cache, the main memory is accessed to read that word, and a block of words containing that word is transferred from main memory to cache memory. Accordingly, future references to memory are more likely to find the required words in the cache memory because of the locality of reference property.

The performance of cache memory is frequently measured in terms of a "hit ratio." When the CPU refers to memory and finds the word in cache, it produces a "hit." If the word is not found in the cache, then it is located in main memory and must be transferred from main memory to the cache for execution. This is called a "miss." The ratio of the number of hits divided by the total CPU references to memory (i.e., hits plus misses) is the hit ratio. Experimental data obtained by running representative programs has indicated that hits ratios of 0.9 (90%) and higher may be obtained. With such high hit ratios, the memory access time of the overall data processing system approaches the memory access time of the cache memory, significantly improving system throughput. Accordingly, the average memory access time of a given data processing system can be improved considerably by implementing a cache memory scheme.

Most data processing systems are typically used to perform many independent tasks. When a task is first begun, the hit ratio of the cache is typically low because the instructions and/or data necessary for processing will not be found in the cache. Such a cache is known as a "cold" cache. Then, as processing of a task continues, more and more of the instructions and/or data which are needed have been loaded from main memory into the cache and may be executed in the cache. The cache is then referred to as a "warm" cache because the hit ratio becomes relatively high.

In order to maximize the hit ratio, many data processing system architectures allow system control over the use of the cache. For example, the cache may be controlled to store instructions only, data only, or both instructions and data. Similarly, the cache may be controlled to lock a particular instruction or sequence of instructions into the cache, without allowing overwrites, thereby preserving frequently used instructions for the CPU to access.

DETAILED DESCRIPTION

In most data processing systems, task schedulers can typically predict the next task to be performed by the CPU with a fairly high degree of reliability. Generally, it is apparent what the next task to be performed by the CPU will be. This predictability can be combined with other operational aspects of a typical data processing system to implement a significantly more effective cache memory scheme.

As explained above, whenever a new task interrupts a currently executing task, the data and instructions required by the CPU to perform the interrupting task are generally not present in the cache. In order to accommodate the needs of the CPU in processing the interrupting task, the cache is loaded as quickly as possible with the necessary instructions and data. In general, instructions and data are loaded into the cache on an "as needed" basis. Because main memory is typically much slower than cache memory, the external memory bus quickly becomes saturated as the system tries to load the requested data and instructions into the cache to meet the CPU's processing requirements. However, once the memory cache has been warmed up, most of the instructions and data required by the CPU for the interrupting task are, through the locality of reference phenomenon, loaded into the cache. Therefore, the external memory bus connecting the cache to main memory is no longer heavily utilized and the external memory bus has available bandwidth. By taking advantage of this available bandwidth, coupled with the capability to predict what the next task will be and the history of the state of the cache at the time the next scheduled task was last interrupted, the anticipating cache loader can begin "pre-warming" the cache with the data and instructions most likely to be required by the CPU after it completes processing for the current task.

Referring now to FIG. 1, an anticipating cache loader 100 according to a preferred embodiment of the present invention includes: a Tag Look Aside Buffer (TLB) 110; a CPU 150; a Memory Management Unit (MMU) 160; a Main Memory 170; a Cache and Directory 180; a Least Recently Used (LRU) line 154; an external memory bus 158; and internal memory buses 152, 156, and 162. TLB 110 contains a mirrored tag array 130, a mirrored tag array 140, a last Task Identification (TID) register 125, a current Task Identification (TID) register 135, and a next Task Identification (TID) register 145. Cache and directory 180 contains a current task region 182, a next task region 184, and an other task region 186. Main memory 170 contains mirrored tags 175.

CPU 150 may be any general purpose microprocessor known to those skilled in the art. MMU 160 is any memory management device used to provide memory management features for a data processing system. Typically, MMU 160 coordinates the loading of data and instructions into cache and directory 180 based on the processing requests from CPU 150.

Main memory 170 may be any memory device used as main memory for a data processing system. This may include any combination of Random Access Memory (RAM), Dynamic RAM (DRAM), Static RAM (SRAM), FLASH memory, etc. Main memory 170 may be implemented by using chips, cards, boards, solid state devices, etc.

In a preferred embodiment of the present invention, cache and directory 180 includes a segmented cache memory. While a segmented cache is not required, the cache is preferably segmented to allow for easier implementation of the invention. Current task region 182 is the area of cache and directory 180 where the data and instructions the CPU needs to process the current task are stored. Next task region 184 is the area of cache and directory 180 where the data and instructions the CPU will need to process the next task are stored. Other task region 186 is an area of cache and directory 180 where the data and instructions for some other task may be stored. Alternatively, frequently used instructions such as system calls, input/output routines and other information may be stored in other task region 186. In another embodiment, other task region 186 may be designated as a last task region and may be used to store the data and instructions that were transferred from current task region 182. In a preferred embodiment, each region of cache and directory 180 is protected and the information in one region is not allowed to overwrite the other regions of cache and directory 180.

The data processing system operating system task scheduler is responsible for maintaining last TID register 125, current TID register 135, and next TID register 145. Based on known operating characteristics and sequences for a given program, the task sequencing for CPU 150 is determined and used to allow ACL 100 to load cache and directory 180 with the appropriate data and instructions for the anticipated sequence of tasks associated with the given program. A minor upgrade to the operating system will be required to implement the capability for the task scheduler to track and assign TID registers 125, 135, and 145.

Many currently available CPUs do not have the capability to access and track the cache tags directly. If this is the case, there needs to be a method for maintaining the integrity between the cache tags and the mirrored tags stored in TLB 110. This can be accomplished in several different ways. LRU 154 is an output signal used by CPU 150 to access a current line of memory in cache and directory 180. Every time CPU 150 accesses a line of memory in cache and directory 180, LRU 154 can be used to identify which specific tag cache line is being updated, and an LRU tag is updated for the line in order to keep a history of usage for each tag entry for a particular cache line. MMU 160 must monitor the output of LRU 154 and update the mirror tags LRU field to match the internal tags. Then, when a cache line miss occurs, and a request to access main memory 170 is generated by CPU 150, the mirror tag can accurately replace the same tag as the internal tag as determined by monitoring the LRU. In this manner, the mirrored tags will always match the internal task tags exactly. Hence, when a future reload of cache and directory 180 occurs, an exact copy of the cache contents can be loaded from main memory 170 by using the mirrored tags.

It should be noted that the use of LRU 154 represents only one possible method for maintaining the integrity of a cache. Other methods may be employed to achieve the same results. For example, if direct access is available to both the current cache tags and the next cache tags, a more direct method of connecting to the mirrored tags could be implemented. In this case, a direct bus could be used to connect cache and directory 180 with TLB 110. Whenever the tags in the cache were updated, the tags in the mirrored tag arrays of TLB 110 would be updated simultaneously. Alternatively, the cache could be redesigned so that the mirrored tags and the actual cache tags are one and the same, thereby achieving the same results. The important thing is that the mirrored tags and the actual cache tags maintain coherency with each other so that the contents of cache and directory 180 can be restored when necessary.

In operation, ACL 100 anticipates the needs of CPU 150 for data and instructions by using the operating system task scheduler to verify the sequence of tasks to be performed by CPU 150. ACL 100 then uses the information stored in TLB 110 to coordinate the loading of cache and directory 180 with appropriate data and instructions from main memory 170 in order to reduce stalls and to improve overall system performance.

For example, three relevant tasks may be represented as Task A, Task B and Task C. Each task will have a unique Task Identification (TID) and a set of tags which identify the data and instructions CPU 150 will need to process each given task. After a preliminary execution sequence, a set of mirrored tags 175 in main memory 170 will have been established for each of the tasks. Task A is the currently running task, Task B is the task scheduled to run next, and Task C is the task scheduled to run after Task B finishes. Each of the three tasks has an associated Task Identification (TID); TID A for Task A, TID B for Task B, and TID C for Task C. An internal timer (not shown) will generate an interrupt signal when the next sequenced task (Task B in this case) is to be activated. Alternatively, an interrupt may be generated from an external component. It should be noted that Task B may not actually need to run at this time but it will be given the opportunity to be activated.

At the time the interrupt for Task B is generated, the state of ACL 100 can be described by reference to the various storage locations and their contents. Current TID Register 135 contains TID A, identifying Task A as the currently executing task. The associated tags for Task A are contained in mirrored tag array 130 (current mirrored tags). These tags serve as a cross reference or index to main memory 170 that allows ACL 100 to locate the appropriate data and instructions in main memory 170. Next TID register 145 has TID B loaded and ACL 100 has also pre-loaded the tags associated with Task B into mirrored tag array 140 (next mirrored tags). In addition, ACL 100 has loaded the cache memory contents in next task region 184 to the state they were in when task B was last interrupted. When the interrupt for task B occurs, next task region 184 should contain the data and instructions CPU 150 needs to process task B. This will allow CPU 150 to immediately begin to access the data and instructions loaded in next task region 184. In addition, when the interrupt for task B occurs, mirrored tag array 140 will be updated so that it is identified as the current mirrored tag array and mirrored tag array 130 will then be identified as the last mirrored tag array. Task B is now the currently executing task.

Assuming that task C is identified by the operating system task scheduler as the next task to be processed by CPU 150, the operating system will write TID C to Next TID register 145. This write action causes an automatic shifting of TID A from Current TID register 135 to Last TID register 125 and TID B will be shifted from Next TID register 145 to Current TID register 135. ACL 100 saves the tags from mirrored tag array 130 back to main memory using the appropriate index (indexed from the TID) and updates the appropriate pages. This will enable cache and directory 180 to be pre-loaded to the same state it was in at the time task B interrupted. The data and instructions for task A will be pre-loaded into cache and directory 180 when task A is scheduled to resume execution. Once the state of task A is completely written back to main memory 170, ACL 100 reassigns mirrored tag array 130 as the next mirrored tag array and starts fetching and pre-loading the tags associated with Task C from main memory 170. ACL 100 fetches this data using the TID stored in Next TID register 145.

Once loaded, ACL 100 starts pre-fetching the data from main memory to pre-load each page to the same condition cache 180 was in when C was last interrupted or preempted. When the data and instructions for task C have been restored, ACL 100 is ready for another interrupt that could cause a subsequent task, such as Task D to be loaded for execution. This would be similar to the previous process in that TID D would be written into next TID register 145, causing TID B to be loaded into last TID 125, and TID C to be written to current TID register 135, and the reassignment of mirrored tag array 140 to last tag array and mirrored tag array 130 to current tag array, and so on.

The process of loading task regions 182 184, and 186 takes place in a fixed priority; the currently executing task always having higher priority than loading the next task or writing the last task back to main memory 170. If the execution period of any task is faster than the write back process for the last task and the pre-load process for the next task, the execution of the present task will have first priority and allow the presently executing task to drive the loading of cache and directory 180 instead of pre-loading the cache for the next task or writing the last task to main memory 170.

Figure 2:
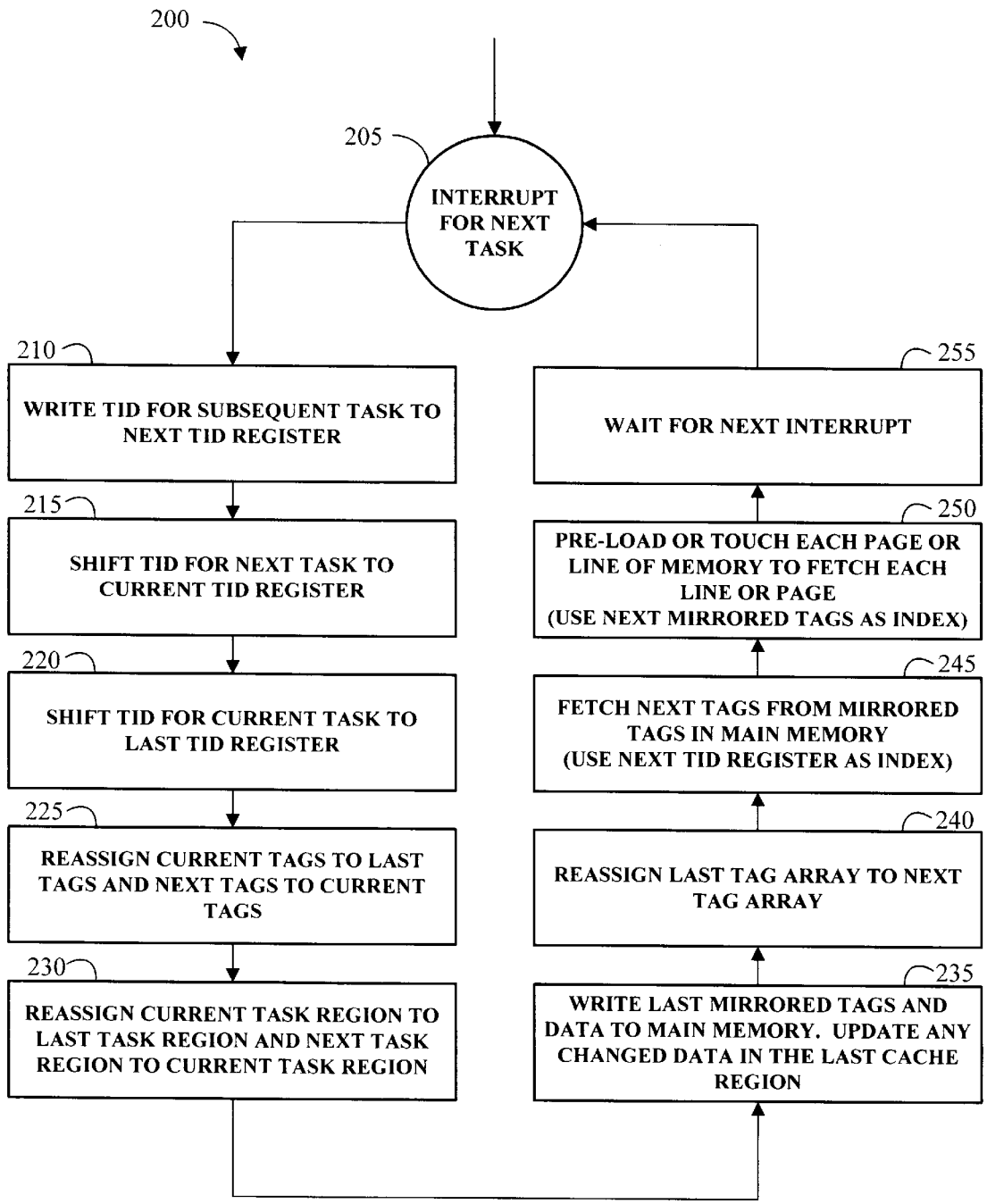
FIG. 2 is a flow chart showing the sequence for using an anticipating cache loader according to a preferred embodiment of the present invention.

Referring now to FIG. 2, a method 200 for utilizing a cache memory in accordance with a preferred embodiment of the present invention is shown. Note that the hardware elements of FIG. 1 are referenced but not shown. CPU 150 is processing a current task and an interrupt for the next task occurs (Step 205). This interrupt may be either an internal interrupt or an external interrupt. When the interrupt occurs, the operating system task scheduler will write the TID for a subsequent task to Next TID Register 145 (Step 210). The action of writing the next task TID to Next TID Register causes a "ripple-through" effect for the other TID registers. The TID previously stored in Next TID Register 145 is shifted to Current TID Register 135 (step 215) and the TID for the current task is shifted from Current TID Register 135 to Last TID register 125 (Step 220). ACL 100 will then reassign the Current Tags to be the Last Tags and the Next Tags to be the Current Tags (Step 225).

At this point, the various regions of cache and directory 180 are also reassigned. Specifically, current task region 182 is reassigned as the last task region and next task region 184 is reassigned as current task region 182 (Step 230). After the task regions have been reassigned, the last mirrored tags and the associated data from the last task region are written back to main memory 170. In addition, any data in the last task region that has changed is updated as well (Step 235). ACL 100 will then assign last tag array as next tag array (Step 240). Using Next TID Register 145 as an index, ACL 100 can fetch the next tags from mirrored tags 175 in main memory 170 (Step 245) and begin preloading next task region 184 to restore next task region 184 to the state that it was in when the next scheduled task was last interrupted (Step 250). The system is now ready to process the task interrupt for the next scheduled task which is the task associated with Next TID Register 145 (Step 255).

While the invention has been particularly shown and described with reference to preferred embodiments thereof, it will be understood by those skilled in the art that various changes in form and details may be made therein without departing from the spirit and scope of the invention. The present invention may be used for an instruction cache, a data cache, or both types of cache memories.

It is claimed:

1. An anticipating cache loader comprising:
   a) an operating system having a task scheduler that has scheduled a previous task and a current task and that identifies a next task;
   b) a memory coupled to a bus;
   c) a cache coupled to the bus;
   d) a CPU coupled to the bus and performing the current task;
   e) a mechanism for restoring the cache while the CPU is performing the current task with the information from the memory that was resident in the cache during the previous task when the next task is the previous task; and
   f) at least one mirrored tag array, the at least one mirrored tag array corresponding to the previous task and containing a plurality of tags that allow the cache to be restored with information from the memory that was resident in the cache when the previous task was last executed, wherein the mechanism for restoring the cache uses the at least one mirrored tag array to load information from the previous task into the cache, and wherein the task scheduler switches tasks from the current task to the next task and the CPU performs the next task.

2. The anticipating cache loader of claim 1 wherein the memory comprises at least one set of mirrored tags corresponding to the previous task and containing a plurality of tags that allow the cache to be restored with information from the memory that was resident in the cache when the previous task was last executed, wherein the anticipating cache loader further comprises a mechanism for transferring some of the plurality of tags to and from the memory, the mechanism transferring some of the tags from the at least one set of mirrored tags to the at least one mirrored tag array.

3. The anticipating cache loader of claim 1 wherein the at least one mirrored tag array futher comprises a second mirrored tag array corresponding to the current task, wherein the cache comprises a plurality of cache tags, and wherein the anticipating cache loader further comprises a mechanism for maintaining integrity between some of the plurality of cache tags and the tags in the mirrored tag array for the current task.

4. The anticipating cache loader of claim 1 wherein the cache is a segmented cache comprising plurality of regions that comprise at least a current task region and a next task region, wherein the CPU performs the current task by accessing the current task region, and wherein the CPU performs the next task by accessing the next task region.

5. An anticipating cache loader comprising:
   a) an operating system having a task scheduler that has scheduled a previous task and a current task and that identifies a next task;
   b) a cache coupled to the bus and having a plurality of cache tags, the cache segmented into a plurality of regions, the regions comprising a current task region and a next task region, the current task region containing information for performing the current task;
   c) a memory coupled to the bus, the memory comprising a plurality of sets of mirrored tags, one of the plurality of sets of mirrored tags corresponding to the previous task and containing a plurality of tags that allow the cache to be restored with information from the memory that was resident in the cache when the previous task was last executed;
   d) a CPU, the CPU being coupled to a bus and performing the current task;
   e) at least two mirrored tag arrays, the mirrored tag arrays corresponding to the current task and the previous task;
   f) a mechanism for maintaining integrity between some of the plurality of cache tags and the tags in the mirrored tag array for the current task;
   g) a mechanism for transferring tags from one of the sets of mirrored tags to one of the at least two mirrored tag arrays and from one of the at least two mirrored tag arrays to one of the sets of mirrored tags; and
   h) a mechanism for restoring the cache while the CPU is performing the current task with the information from the memory that was resident in the cache during the previous task when the next task is the previous task, wherein the mechanism for transferring tags copies at least a portion of the set of mirrored tags that corresponds to the previous task to the mirrored tag array that corresponds to the previous task, wherein the mechanism for transferring tags copies at least some of the tags from the mirrored tag array that corresponds to the current task to the set of mirrored tags that corresponds to the current task, wherein the mechanism for restoring the cache uses the mirrored tag array that corresponds to the previous task to load information from the previous task into the next task region, and wherein the task scheduler switches tasks from the current task to the next task and the CPU performs the next task by accessing the next task region.

6. A method for improving the performance of a cache in an apparatus, the apparatus comprising the cache that is coupled to a bus, a CPU coupled to the bus, a memory coupled to the bus, an operating system residing in the memory and having a task scheduler that schedules a plurality of tasks for the CPU to perform, the method comprising the steps of:

identifying one of the plurality of tasks as a next task to be performed by the CPU;

identifying one of the plurality of tasks as a previous task;

the CPU performing a current task with the cache containing information pertaining to the current task;

providing at least one mirrored tag array, the at least one mirrored tag array corresponding to the previous task and containing a plurality of tags that allow the cache to be restored with information from the memory that was resident in the cache when the previous task was last executed;

restoring the cache while the CPU performs the first task, wherein the step of restoring uses the at least one mirrored tag array to restore the information from the memory that was resident in the cache when the next task to be performed by the CPU is the previous task;

the task scheduler switching task from the current task to the next task; and the CPU performing the next task.

7. The method of claim 6 wherein the memory comprises at least one set of mirrored tags corresponding to the previous task and containing a plurality of tags that allow the cache to be restored with information from the memory that was resident in the cache when the previous task was last executed, wherein the method further comprises the step of transferring some of the tags from the at least one set of mirrored tags to the at least one mirrored tag array.

8. The method of claim 6 wherein the at least one mirrored tag array is at least two mirrored tag arrays, the other of the mirrored tag arrays corresponding to the current task, wherein the cache comprises a plurality of cache tags, and wherein the method further comprises the step of maintaining integrity between some of the plurality of cache tags and some of the plurality of tags in the mirrored tag array for the current task.

9. The method of claim 6 wherein the cache is a segmented cache comprising plurality of regions that comprise at least a current task region and a next task region, wherein the CPU performs the current task by accessing the current task region, and wherein the CPU performs the next task by accessing the next task region.

10. A method for improving the performance of a segmented cache in an apparatus, the apparatus comprising the cache that is coupled to a bus, a CPU coupled to the bus, a memory coupled to the bus, an operating system residing in the memory and having a task scheduler that schedules a plurality of tasks for the CPU to perform, the method comprising the steps of:

a) the task scheduler identifying a previous task;

b) identifying a next task;

c) providing regions in the cache comprising a current task region and a next task region, the current task region containing information for performing the current task;

d) the CPU performing the current task;

e) providing a plurality of sets of mirrored tags in the memory, one of the plurality of sets of mirrored tags corresponding to the previous task and containing a plurality of tags that allow the cache to be restored with information from the memory that was resident in the cache when the previous task was last executed;

f) providing at least two mirrored tag arrays, the mirrored tag arrays comprising a plurality of tags and corresponding to the current task and the previous task;

g) maintaining integrity between some of the plurality of cache tags and the tags in the mirrored tag array for the current task;

h) copying at least a portion of the set of mirrored tags that corresponds to the previous task to the mirrored tag array that corresponds to the previous task;

i) copying at least some of the tags from the mirrored tag array that corresponds to the current task to the set of mirrored tags that corresponds to the current task;

j) restoring the cache while the CPU is performing the current task with the information from the memory that was resident in the cache during the previous task when the next task is the previous task, wherein the step of restoring the cache uses the mirrored tag array that corresponds to the previous task to load information from the previous task into the next task region; and k) the task scheduler switching tasks from the current task to the next task and the CPU performs the next task.

* * * * *